3,169,853
PROCESS FOR ROASTING IRON SULFIDES TO FORM SULFUR DIOXIDE AND MAGNETITE
Adriaan C. van Es, Rotterdam, Netherlands, assignor, by mesne assignments, to Albatros Zwavelzuur-En Chemische Fabrieken N.V., Utrecht, Netherlands, a corporation of the Netherlands
No Drawing. Filed Jan. 16, 1961, Ser. No. 82,673
10 Claims. (Cl. 75—9)

This invention relates to the roasting of iron sulfides, e.g., pyrite, pyrrhotite, etc., to produce useable sulfur dioxide and useable iron oxides while providing a useable level of heat recovery. In particular, this invention makes possible the roasting of iron sulfides contaminated with compounds of copper, nickel and cobalt to form sulfur dioxide which is suitable for the manufacture of sulfuric acid and iron oxide which is suitable or can be easily made suitable for use in making high grade iron and steel. Additionally, such roasting provides economically extractable levels of heat for use in boilers and the like.

Iron pyrites are extensively used for producing sulfuric acid by burning the pyrites to sulfur dioxide which in turn, after scrubbing and other preparatory operations, is converted to sulfuric acid in the well known manufacturing methods. The calcine from the roasting operation, depending upon its content, is either discarded or employed in making iron, thereby obtaining maximum utilization of raw materials. Impurities in the iron pyrite raw material, if not removed before, during or after the roasting operation, will appear in the sulfur dioxide gases or in the calcine, making such gases or calcine unuseable for producing, respectively, sulfuric acid or iron.

The composition of iron pyrites determine the products obtained from roasting. Additionally, the conditions of roasting determine to a large extent the type and quality of products obtained. The roasting of substantially pure iron pyrites can result in substantially pure ferric oxide and sulfur dioxide, depending on the particular conditions of roasting. However, substantially pure or high grade iron pyrites exist in limited quantities in the world today and are rapidly diminishing, whereas natural supplies of contaminated or impure iron pyrites are more prevalent. Thus, the need has arisen for developing new processes for economically roasting such impure pyrites to produce easily useable sulfur dioxide and iron oxide calcine.

Particularly difficult impurities to remove from pyrites are compounds of copper, nickel and cobalt, especially those of copper. In the normal roasting operation impurities of these compounds appear as insoluble components of the calcine which then must be put to long and involved separation or purifying operations to present a calcine suitable for use in making iron. One commercially used method for removing copper impurities is to subject the calcine to a chloridizing roast followed by a leaching operation to remove copper. This method is effective but extremely costly.

Heretofore, a process known as the sulphatizing roast was available for roasting copper-bearing iron pyrites to provide a leachable calcine suitable for the manufacture of iron. This process employs closely controlled, low temperatures, e.g., well below 700° C., and excess amounts of oxygen to convert the copper content of the pyrite into copper sulfate which is soluble and very little ferric sulfate is formed from the ferric oxide in the calcine. The process solves the problem of copper-contaminated calcines but produces large amounts of sulfur trioxide and, of course, sulfates, resulting in high sulfur losses.

High temperatures in the roasting step could reduce the amount of sulfur trioxide and sulfate loss but the copper in the calcine becomes insoluble due to cupric ferrite formation and, thus, is not easily removed. A reduction in the proportion of oxygen to pyrite in the roasting process to lessen sulfur trioxide formation results in an incomplete conversion of copper to copper sulfates or oxides and leaves a high amount of difficulty removable copper and/or iron sulfides in the calcine. An even further reduction in the oxygn to pyrites ratio results in incomplete oxidation of sulfur to sulfur dioxide with the consequence that elementary sulfur is carried over by the roast gases and unoxidized sulfides remain in the cinder. Elementary sulfur in the roast gases must be removed to avoid sulfur loss and to prevent deposition onto boiler tubes and fouling of other equipment thus interfering with the efficient operation thereof. The resulting calcine must be subjected to complex and expensive leaching (sulfides in the calcine tend to consume large amounts of leachng reagent) or subsequent roasting operations. Thus, while a lower amount of oxygen may alleviate sulfur trioxide formation, it defeats the purpose of a sulphatizing roast, i.e., to reduce the amount of insoluble copper in the calcine and to permit the economical leaching of the calcine.

It is therefore an object of this invention to provide a process for obtaining sulfur dioxide which is readily convertible into sulfuric acid and an iron oxide calcine free of objectionable amounts of copper and suitable for iron production, all from copper-bearing iron pyrites.

A further object is the provision of a process wherein copper-bearing iron pyrites are burned to form sulfur dioxide suitable for sulfuric acid production and an iron oxide calcine which is easily leached to give an iron oxide sufficiently free of copper to enable its use in iron production.

Another object is the provision of a process wherein the above objects are accomplished without elaborate and complicated pretreatments or after-treatments.

A further object is the provision of a process for carrying out the above objects wherein roasting gas recycles and calcine recycles are not needed.

A further object is to provide a process for carrying out the above objects and at the same time providing heat at readily extractable level for use in other operations, e.g., boilers.

A still further object is to provide a process which produces an iron oxide calcine which is in condition for, or which can be easily put in condition for, the production of iron by roasting an impure iron pyrites containing copper, cobalt and/or nickel.

Other objects and advantages will become apparent from the following description.

It has been that, when finely divided pyrites containing copper, nickel and/or cobalt contaminants are roasted to produce magnetite, $Fe_3O_4$, which is substantially free of ferric oxide, the cinders or calcine produced can be leached to remove substantial amounts of the contaminants and thereby produce iron oxides which are considerably more valuable in making iron or steel. Furthermore, it has been found that by controlling temperatures and oxygen amounts in the roasting process, sulfur dioxide, which is substantially free of sulfur trioxide and sulfur vapors and thus suitable for the economical production of sulfuric acid, is also obtained. For example, when finely divided iron pyrites of a particular composition, containing copper, nickel and/or cobalt contaminants, were subjected in a fluidized bed to a temperature of about 700° C. to less than 900° C., preferably about 800° C., and oxygen in the amount of about 94% to 103% of, and preferably about 100% to 102% of, that amount necessary to oxidize the entire sulfide sulfur content of the pyrites to sulfur dioxide and the entire iron content of the pyrites to magnetite, $Fe_3O_4$, there were obtained a calcine, which surprisingly could be easily leached to remove any objectionable quantities of said contaminants, and sulfur dioxide, which was substantially free of sulfur trioxide and sulfur vapors which could be readily put in condition for sulfuric acid production. Temperatures above this range have been found to produce insoluble ferrites by reaction of the contaminants with the iron in the pyrites and to increase sulfur sublimation resulting in sulfur vapors contaminating the roast gases. Temperatures below this range have been found to favor sulfur trioxide production, depreciate sulfur dioxide in the roast gases, increase the amount of troublesome dust in the roast gases and reduce the economic utilization of heat from the roasting. Sulfur trioxide formation increases the sulfur loss and presents costly purification difficulties prior to sulfuric acid production. Amounts of oxygen over the range set forth above increase sulfur trioxide formation giving the above-mentioned disadvantages and increases ferrite formation with contaminants to form an impure calcine which is expensive or impossible to put into condition for iron production. Oxygen in amounts below said range result in incomplete conversion of total sulfur to sulfur dioxide and leaves high amounts of sulfide sulfur in the calcine which then consumes inordinate quantities of leaching solution and results in elementary sulfur vapors in the roast gas, which present costly purification difficulties prior to sulfuric acid production from such roast gases. Additionally, the amount of sulfur dioxide in the roast gases is considerably reduced. The temperatures and amount of oxygen used for a particular pyrites are critical to this extent and cannot be widely varied.

In forming the fluidized bed, any of the heretofore known methods and apparatus can be used. Many methods and apparatus for extracting heat from the bed are known and can be used to obtain maximum economic benefit from the process. The usual roast gas-treating methods and apparatus and the usual leaching methods and apparatus are used for conditioning the roast gases and calcines for sulfuric acid manufacture or iron production as the case may be. In summary, the process of this invention can be carried out in existing equipment and/or using existing procedures or can be carried out in new equipment and/or using new procedures.

Any apparatus and/or procedure other than a fluidized bed can be employed for carrying out this invention, although the fluidized bed mode is at the present time preferred for its efficiency and ease of operation.

The hot calcines resulting from the roasting process of this invention should not be allowed to oxidize after removal from the roaster. They should be cooled in the absence of oxygen, e.g., by quenching, to avoid ferric oxide formation and resulting ferrite formation with the copper, nickel and/or cobalt contaminants thereby converting the contaminants into insoluble, unleachable form.

Any of the many well known leaching solutions can be employed under oxidizing conditions to remove the copper, cobalt and/or nickel contaminants from the calcine. It is important in obtaining the best results to leach the calcines in the presence of oxygen and, in many cases, the addition of an oxidizing agent, such as potassium persulfate, increases the leaching power of the leach solution. As examples, the following leaching systems have been found to be extremely useful in removing copper, cobalt and/or nickel contaminants from the calcines: (a) ammoniacal ammonium carbonate, (b) ammoniacal ammonium carbonate with air or oxygen, (c) ammoniacal ammonium carbonate with an oxidizing agent, (d) cupric ammonium carbonate and ammoniacal ammonium carbonate, (e) same as (d) followed by ammoniacal ammonium carbonate treatment, (f) dilute sulfuric acid, (g) dilute sulfuric acid with air or oxygen, (h) dilute sulfuric acid with an oxidizing agent, (i) dilute sulfuric acid with ferric sulfate. Any one or combination of the above-listed leaching systems can be employed.

Any iron pyrites contaminated by copper, cobalt and nickel impurities can be roasted according to this process to obtain the unexpected advantages described above. As an example, calcines having copper, cobalt and/or nickel contaminants reduced below 0.1 percent are extremely useful in making high grade iron and presently are in high demand by the iron and steel industry. If the contaminant content of the leached calcine is over 0.8 weight percent, other methods of purification, e.g., the chloridizing roast, may be economically practicable at the present time. Thus, the novel roasting process not only simplifies the method of reducing copper, nickel and/or cobalt contaminants in leached calcines, it also permits the economic use of iron pyrites which heretofore could not be used because of copper, cobalt or nickel contamination.

Pyrites resulting as residues from flotation concentration of sulfide ores are advantageously used, although pyrites obtained in other ways, crushed or comminuted to suitable size for the preparation of a suitably stable, fluidized bed can also be used.

The following examples specifically illustrate the invention. In these examples, all percents and parts are by weight and all temperatures are in the centigrade scale.

EXAMPLES 1–7

The pyrites used in these examples contained about 50.0% sulfide sulfur, about 44.8% iron and about 0.25% copper, the unaccounted remainder comprising less than one-half percent moisture and other impurities. The particle size of the pyrites used was less than 0.5 mm. The pyrites were uniformly fed into the bottom of a fluidized bed reactor just above the air inlet and the operating conditions set forth in Table I respectively applied to each example. The maximum bed temperature in each run was 800° C. throughout the run.

*Table I*

A. OPERATING CONDITIONS

| Ex. No. | Duration, Hours | Average Air Feed, Nm.³/hr.[1] | Average Pyrites Feed, kg./hr. | Space Velocity cm./sec. | Air, percent of Theoretical[2] |
|---|---|---|---|---|---|
| 1 | 13.0 | 31.36 | 14.35 | 46 | 97.7 |
| 2 | 4.0 | 31.23 | 13.88 | 46 | 100.6 |
| 3 | 3.5 | 30.12 | 13.32 | 44 | 101.1 |
| 4 | 48.0 | 31.43 | 13.89 | 46 | 101.3 |
| 5 | 48.0 | 31.21 | 14.05 | 46 | 99.4 |
| 6 | 48.0 | 25.07 | 11.03 | 37 | 101.7 |
| 7 | 48.0 | 31.14 | 14.34 | 46 | 97.2 |

[1] Normal cubic meters per hour given at standard conditions of 0° C. and one atmosphere pressure.
[2] Theoretical air is that amount required to oxidize all of the iron of the pyrites to magnetite, Fe₃O₄, and all the sulfide sulfur thereof to sulfur dioxide.

B. PRODUCT ANALYSIS

| Ex. No. | Cinders To Pyrites Ratio | Percent Sulfur in Cinders | Percent Cu in Cinders | Percent SO₂ in Roast Gases | Percent Cu in Leached Cinders | Leaching Method Used |
|---|---|---|---|---|---|---|
| 1 | 0.54 | 1.60 | 0.33 | 13.9 | 0.09 | C |
| 2 | 0.55 | 0.82 | 0.28 | 12.8–13.5 | 0.08 | A |
|   |      |      |      |           | 0.06 | B |
|   |      |      |      |           | 0.09 | C |
| 3 | 0.61 | 0.76 | 0.36 |           | 0.09 | C |
|   |      |      |      |           | 0.08 | A |
|   |      |      |      |           | 0.07 | B |
| 4 | 0.51 | 0.34 | 0.34 | 13.1–13.9 | 0.07 | C |
|   |      |      |      |           | 0.08 | H |
|   |      |      |      |           | 0.07 | I |
|   |      |      |      |           | 0.06 | J |
| 5 | 0.60 | 0.79 | 0.31 | 15.5–16.3 | 0.066 | D |
|   |      |      |      |           | 0.047 | A |
| 6 | 0.62 | 0.22 | 0.28 | 15.7–16.2 | 0.080 | E |
|   |      |      |      |           | 0.051 | F |
|   |      |      |      |           | 0.081 | G |
| 7 | 0.62 | 1.46 | 0.28 | 15.7–16.0 | 0.083 | G |

The following leaching methods were employed using 200 ml. of the aqueous leaching solution described below for each 50 g. of cinders:

A—A 2% sulfuric acid leaching solution was added to the cinders and resulting mixture was stirred for 4 hours at 70 to 80° C. in the presence of air.

B—A leaching solution containing 5% $Fe_2(SO_4)_3$ and 1% sulfuric acid was added to the cinders and the resulting mixture was stirred for 4 hours at 70 to 80° C. in the presence of air.

C—An ammoniacal ammonium carbonate leaching solution containing 120 g./l. $NH_3$ and 90 g./l. $CO_2$ and 10 g. of potassium persulfate (per 200 ml. of solution) was added to the cinders and the resulting mixture was stirred for 4 hours in the presence of air.

D—A 2% sulfuric acid leaching solution containing 10 g. potassium persulfate (per 200 ml. of solution) was added to the cinders and the resulting mixture was stirred for 8 hours at 75° C. in the presence of air.

E—An ammoniacal ammonium carbonate leaching solution containing 125 g./l. $NH_3$ and 111 g./l. $CO_2$ was added to the cinders and the resulting mixture was stirred for 8 hours at room temperature in the presence of air.

F—The leaching solution of Method E was added to the cinders and the resulting mixture was rolled or tumbled for 8 hours at room temperature in the presence of air.

G—The leaching solution of Method E to which 10 g. of potassium persulfate (per 200 ml.) was added to the cinders and the resulting mixture was rolled or tumbled for 8 hours at room temperature.

H—A cupric ammonium carbonate leaching solution containing 60 g./l. Cu, 120 g./l. $NH_3$ and 90 g./l. $CO_2$ was added to the cinders and the resulting mixture agitated in air for 2 hours at room temperature. The cinders were then filtered and stirred with an ammoniacal ammonium carbonate leaching solution (120 g./l. $NH_3$ and 90 g./l. $CO_2$) for 2 hours at room temperature in the presence of air.

I—Same procedure as Method H but the second mixture of cinders and ammonium carbonate leaching solution was stirred for 4 hours at room temperature in the presence of air.

J—An ammoniacal ammonium carbonate leaching solution (120 g./l. $NH_3$ and 90 g./l. $CO_2$) was added to the cinders and the resulting mixture was agitated for 16 hours at room temperature in the presence of air.

EXAMPLE 8

The operating conditions shown in Table II were applied to a fluidized bed of iron pyrite having 44.8 percent iron, 50.0 percent sulfide sulfur and 0.25 percent copper. Exit gas analysis and solid product distribution data are provided in Table II also.

Table II
OPERATING CONDITIONS

| | |
|---|---|
| Fluid bed temp., ° C. | 800 |
| Feed rate, gms./min. | 26.2 |
| Air rate, cu. ft./min. at standard conditions | 2.1 |
| Percent theoretical air [1] | 100 |
| Space velocity, ft./sec. | 1.52 |
| Fluid bed depth (0' flow pipe ht.), ft. | 2.5 |
| Exit gas analyses (percent by volume): | |
| $SO_2$ | 16.5 |
| $O_2$ | 0.0 |
| Product distribution: | |
| Overflow, gms./100 gms. feed | 30.2 |
| Overflow, wt. percent of total product | 45.2 |
| Cyclone, gms./100 gms. feed | 27.8 |
| Cyclone, wt. percent of total product | 41.7 |
| Sock, gms./100 gms. feed | 8.8 |
| Sock, wt. percent of total product | 13.1 |
| Total product, gms./100 gms. feed | 66.8 |

[1] Theoretical air = air required to oxidize all Fe to $Fe_3O_4$ and all sulphide sulphur to $SO_2$.

Chemical analyses of the feed and of the reactor products are given in Table III.

Table III
CHEMICAL ANALYSES OF FEED AND REACTOR PRODUCTS

| | Fe | Cu | Total Sulphur | Sulphate Sulphur | Sulphide Sulphur[1] |
|---|---|---|---|---|---|
| Pyrite Feed Heads | 44.8 | 0.25 | 50.2 | 0.2 | 50.0 |
| Formal Overflow | 63.2 | 0.37 | 0.21 | 0.06 | 0.15 |
| Formal Cyclone | 66.5 | 0.41 | 0.33 | 0.11 | 0.22 |
| Formal Sock | 61.9 | 0.46 | 1.9 | 1.8 | 0.10 |

[1] Percent sulphide sulphur by difference between total sulphur and sulphate sulphur.

The overflow, cyclone and sock calcines were leached with a leach solution containing 5 percent ferric sulfate, $Fe_2(SO_4)_3$, and 1 percent sulfuric acid for four hours at 70° C. Copper and iron analyses of each of the calcines are presented in Table IV.

Table IV
CHEMICAL ANALYSES OF LEACH RESIDUES

| | Cu | Fe |
|---|---|---|
| Overflow Leach Residue | 0.10 | 64.1 |
| Cyclone Leach Residue | 0.06 | 67.7 |
| Sock Leach Residue | 0.09 | 65.0 |
| Calculated Composite Leach Residue[1] | 0.08 | 65.7 |

[1] Calculated composite based on weight ratio of formal products from the roasting tests.

An ammoniacal ammonium carbonate leach was applied to an unleached composite calcine containing 0.39% copper and comprising 52 parts of overflow calcine and 48 parts of cyclone calcine. The aqueous leach solution contained 95.2 g./l. of $NH_3$ and 98.5 g./l. of $CO_2$ and was contacted with the calcine in the ratio of 100 weight parts of calcine to 500 volume parts of leach solution for 24 hours at room temperature in an open reaction vessel. The leached calcine contained 61.3% iron, 0.1% copper and 0.09% sulfur.

EXAMPLE 9

The operating conditions shown in Table V were applied to a fluidized bed of iron pyrite having 50.0 percent sulfide sulfur. Exit gas sulfur dioxide content, calcine sulfide sulfur content and copper content in the leached calcine are also shown in the table. Leaching was conducted in a similar manner as in Example 8 using an aqueous solution containing 5% ferric sulfate and 1% sulfuric acid.

Table V

| | |
|---|---|
| Temperature, ° C. | 800 |
| Operating time, hrs. | 4 |
| Feed rate, gms./min. | 26.0 |
| Air rate, cu. ft./min. at standard conditions | 2.0 |
| Space rate, ft./sec. | 1.41 |
| Percent theoretical air | 95 |
| Percent $SO_2$ in exit gas | 15.6 |
| Percent S=—S in: | |
| Overflow | 0.66 |
| Cyclone | 0.72 |
| Percent Cu in leached calcine: | |
| Overflow | 0.10 |
| Cyclone | 0.08 |

Although certain specific embodiments of this invention have been disclosed to illustrate the invention, it will be understood that various changes and modifications can be made therein without departing from the scope and spirit of said invention. For example, a fluidized bed need not be employed, although it is a convenient way of carrying out the roasting. Any apparatus or device can be used to ensure the intimate contact of oxygen and the finely divided pyrites.

What is claimed is:

1. A process of burning iron sulfide contaminated with non-ferrous metal substances from the class consisting of copper, nickel and cobalt values to form sulfur dioxide gas suitable for sulfuric acid production and iron oxide cinders suitable for iron production while extracting usable heat from the process, comprising, reacting said sulfide in a fluidized bed with oxygen in an amount of 94% to 103% of that amount necessary to oxidize the total sulfide sulfur content of said sulfide to sulfur dioxide and the total iron content to magnetite, controlling the temperature of said fluidized bed within the range of about 700° C. to less than 900° C. to form sulfur dioxide and magnetite cinder, removing said sulfur dioxide and magnetite cinder from said fluidized bed, and leaching said magnetite cinder with an oxidizing leach solution to remove said values.

2. A process for burning iron sulfide contaminated with non-ferrous metal substances from the class consisting of copper, nickel and cobalt values to form iron oxide calcine which is leachable to remove said values and to form sulfur dioxide suitable for sulfuric acid production while extracting useable heat from the process, comprising feeding said sulfide to a fluidized bed maintained at a temperature of about 700° C. to less than 900° C., feeding a gas to said bed, said gas containing an amount of oxygen equal to 94% to 103% of that amounut necessary to oxidize the sulfide sulfur content of said sulfide to sulfur dioxide and the iron content of said sulfide to magnetite, thereby forming sulfur dioxide gas and a calcine containing magnetite, removing said sulfur dioxide and said calcine from said bed under non-oxidizing conditions.

3. A process for burning iron sulfide contaminated with copper compounds to form iron oxide calcines suitable for iron production and sulfur dioxide suitable for sulfuric acid production, while extracting useable heat from the process, comprising, feeding said sulfide to a reaction zone, feeding a gas to the reaction zone, said gas containing an amount of oxygen equal to 94% to 103% of that amount necessary to oxidize the sulfide sulfur content of said sulfide to sulfur dioxide and the iron content of said sulfide to magnetite, forming and maintaining a fluidized bed at a temperature of about 700° C. to less than 900° C. with the sulfide feed and gas feed in the reaction zone, separating sulfur dioxide from said bed, separating a calcine containing magnetite from said bed, and leaching said calcine with an acidic ferric sulfate leach solution in the presence of air to remove copper impurities.

4. A process for burning iron sulfide contaminated with copper compounds to iron oxide calcine which is leachable to reduce the level of copper content to render said calcine suitable for iron production and to form sulfur dioxide suitable for sulfuric acid production, while extracting useable heat from the process, comprising, feeding said sulfide to a reaction zone, feeding a gas to the reaction zone, said gas containing oxygen in an amount equal to 94% to 103% of that amount necessary to oxidize the sulfide sulfur content of said sulfide to sulfur dioxide and the iron content of said sulfide to magnetite, forming and maintaining a fluidized bed at a temperature of about 700° C. to less than 900° C. with the sulfide feed and gas feed in the reaction zone, separating sulfur dioxide from said bed, and separating a calcine containing magnetite from said bed.

5. A process of burning iron sulfide contaminated with non-ferrous metal substances from the class consisting of copper, nickel and cobalt values to form sulfur dioxide gas suitable for sulfuric acid production and iron oxide cinders suitable for iron production while extracting useable heat from the process, comprising, reacting said sulfide in a fluidized bed with oxygen in an amount of 94% to 103% of that amount necessary to oxidize the total sulfide sulfur content of said sulfide to sulfur dioxide and the total iron content to magnetite, at a temperature of about 800° C. to form sulfur dioxide and magnetite cinder, removing said sulfur dioxide and magnetite cinder from said fluidized bed, and leaching said magnetite cinder with an oxidizing leach solution to remove said values.

6. The process claimed in claim 5 wherein the amount of oxygen is about 101% of that amount necessary to oxidize the total sulfide sulfur content of said sulfide to sulfur dioxide and the total iron content of said sulfide to magnetite.

7. A process for burning iron sulfide contaminated with copper compounds to iron oxide calcine which is leachable to reduce the level of copper content to render said calcine suitable for iron production and to form sulfur dioxide suitable for sulfuric acid production, while extracting useable heat from the process, comprising, reacting said sulfide in a fluidized bed maintained at a temperature of about 800° C. with a gas containing oxygen in an amount equal to about 101% of that amount necessary to oxidize the sulfide sulfur content of said sulfide to sulfur dioxide and the iron content of said sulfide to magnetite, thereby forming sulfur dioxide and a leachable calcine containing magnetite, separating said sulfur dioxide from said bed, and separating said leachable calcine containing magnetite from said bed.

8. The process claimed in claim 1 wherein the calcine is leached with an aqueous ammoniacal ammonium carbonate solution in the presence of air.

9. The process claimed in claim 5 wherein the calcine is leached with a dilute aqueous solution of ferric sulfate and sulfuric acid in the presence of air.

10. The process claimed in claim 5 wherein the calcine is leached with an aqueous ammoniacal ammonium carbonate solution in the presence of air.

References Cited in the file of this patent

UNITED STATES PATENTS

| 2,119,270 | De Vecchis | May 31, 1938 |
| 2,761,764 | Johannsen | Sept. 4, 1956 |
| 2,817,583 | Schlecht et al. | Dec. 24, 1957 |
| 2,993,778 | Johannsen et al. | July 25, 1961 |

OTHER REFERENCES

Liddell: Handbook of Non-Ferrous Metallurgy, vol. 2, 1st ed., 1926, published by McGraw-Hill Book Co., Inc., New York, N.Y., pages 1065–1071.